United States Patent Office 3,219,718
Patented Nov. 23, 1965

3,219,718
PREPARATION OF DECAHYDRONAPHTHALENES
Abraham Schneider, Los Angeles, Calif., assignor to Sun Oil Company, Philadelphia, Pa., a corporation of New Jersey
No Drawing. Filed Dec. 3, 1962, Ser. No. 241,512
11 Claims. (Cl. 260—666)

This application is a continuation-in-part of my copending applications Serial No. 69,798, filed November 17, 1960; Serial No. 156,127, filed November 30, 1961; and Serial No. 216,027, filed August 10, 1962, both of the first two mentioned applications now being abandoned.

This invention relates to the preparation of decahydronaphthalenes by the rearrangement of dicyclic naphthenes having two uncondensed $C_6$ rings and 12–20 carbon atoms per molecule.

Decahydronaphthalene and its alkyl substituted homologues generally have been prepared heretofore by the hydrogenation of naphthalenes of corresponding structure. I have now found that decahydronaphthalenes can be prepared by the rearrangement of uncondensed dicyclic naphthenes having two cyclohexyl rings utilizing an aluminum halide-hydrogen halide catalyst. Any uncondensed dicyclic naphthene having 12–20 carbon atoms and two cyclohexyl rings in the presence of such catalyst at a temperature in the range of −20° C. to 70° C. will rearrange to form decahydronaphthalenes having the same empirical formula as the dicyclic naphthene. The decahydronaphthalenes formed when relatively long reaction times are used, e.g., 1–5 hours, are an equilibrium mixture of isomers having the same number of carbon atoms per molecule as the dicyclic naphthene used as starting material. The isomers produced are decahydronaphthalenes in which the substituents on the rings are substantially all methyl groups.

According to the invention, one or more uncondensed dicyclic naphthenes as specified above is reacted in the presence of a catalyst system comprising an aluminum halide and hydrogen halide at a temperature in the range of −20° C. to 70° C., more preferably 0–50° C. Rearrangement of the starting naphthene rapidly occurs and decahydronaphthalenes having the same number of carbon atoms as the dicyclic naphthene charged are formed in high yield. A small amount of by-products including paraffins of the $C_4$–$C_7$ range and monocyclic naphthenes of the $C_8$–$C_{11}$ range also generally are formed. The catalyst can comprise the combination of $AlBr_3$–HBr or $AlCl_3$–HCl, and preferably is in the form of a complex with hydrocarbon as hereinafter described, which complex is insoluble in the hydrocarbon reactant. When $AlBr_3$ and HBr are used, the reaction can also be carried out in a homogeneous system with the $AlBr_3$ and HBr being dissolved in the hydrocarbon. Any of these catalyst systems are capable of rapidly effecting the rearrangement reaction with the rate of reaction depending upon the temperature selected. Typically, complete rearrangement of the starting naphthene to the decahydronaphthalene carbon skeletal structure can be effected at room temperature in less than fifteen minutes, although a longer reaction time may be required if an equilibrium mixture of decahydronaphthalene isomers is desired.

The hydrocarbon charge for the present process can be any uncondensed dicyclic napthene having 12–20 carbon atoms and two cyclohexyl rings or any mixture of such naphthenes. The following are examples of such naphthenes and the products obtained therefrom:

Dicyclohexyl→dimethyl decahydronaphthalenes
Dicyclohexyl methane→trimethyl decahydronaphthalenes
Dimethyl dicyclohexyls→tetramethyl decahydronaphthalenes
Dicyclohexyl ethanes→tetramethyl decahydronaphthalenes
Dicyclohexyl butanes→hexamethyl decahydronaphthalenes
Dicyclohexyl hexanes→octamethyl decahydronaphthalenes
3,3′-diethyl dicyclohexyl methane→heptamethyl decahydronaphthalenes When the dicyclic naphthene is one that has fifteen or more carobn atoms, the resulting polymethyldecahydronaphthalenes tend to be unstable in the presence of the catalyst and may decompose into other hydrocarbons including $C_4$–$C_7$ paraffins, particularly isobutane, and olefins which in the presence of the catalyst convert to sludge. To avoid or minimize such undesirable reaction when reacting $C_{15}$–$C_{20}$ dicyclic naphthenes, mild reaction conditions including a low temperature in the specified range and a short reaction time should be used.

An aluminum halide catalyst obtained by combining $AlCl_3$ with HCl or $AlBr_3$ with HBr is used to effect the isomerization reaction of the present process. With either aluminum halide the catalyst preferably is a liquid complex obtained by reacting the aluminum halide and hydrogen halide in the presence of one or more paraffin hydrocarbons having at least seven and more preferably at least eight carbon atoms. When $AlCl_3$ is used it is preferable to use paraffin hydrocarbons which have at least nine carbon atoms. This complex type of catalyst is insoluble in the reaction mixture, and the activity of the catalyst depends upon having at least a small amount of uncomplexed $AlCl_3$ or $AlBr_3$ present therein. When the aluminum halide is $AlCl_3$, it is also desirable to maintain a relatively high partial pressure of HCl, such as 100–500 p.s.i., in the reaction zone to increase catalytic activity. With $AlBr_3$ a high partial pressure of HBr is not needed and high activity is obtained as long as there is a slight partial pressure of HBr. The catalyst complex is a colored mobile liquid and typically is bright orange-yellow when $AlBr_3$ is used and brown when the aluminum halide is $AlCl_3$. In preparing the complex any paraffin hydrocarbon or mixture of such paraffins having seven or more carbon atoms can be used, but it is desirable to use a branched paraffin, e.g., one having at least two branches, in order to reduce the time for preparing the complex and it is particularly preferred that such isoparaffins have at least eight carbon atoms per molecule. The proportion of catalyst complex to the dicyclic naphthene charged is not critical but it is generally desirable to employ a weight ratio of complex to hydrocarbon of at least 1:10 and more preferably at least 1:1. A slow degradation of the catalyst generally will occur over a course of time, particularly when $AlBr_3$ is used to make the catalyst, but the addition of a small amount of fresh aluminum halide from time to time will reactivate the catalyst. Also a portion or all of the catalyst complex can be replaced from time to time by fresh catalyst complex to maintain catalytic activity.

Preparation of the catalyst complex comprises dissolving or suspending the aluminum halide in the paraffin hydrocarbon and passing the hydrogen halide into the mixture. This can be done at room temperature, although the use of an elevated temperature such as 50–100° generally is desirable to increase the rate of reaction. For best results at least five moles of the paraffin per mole of $AlCl_3$ or $AlBr_3$ should be employed. Under these conditions some of the paraffin evidently breaks into fragments, yielding a $C_4$ fragment which becomes the hydrocarbon portion of the complex. In the cas of $AlB_3$ as the reaction proceeds the mixture becomes milky and the orange-yellow liquid complex then precipitates from the hydrocarbon phase. Addition of HBr is continued until the milky appearance has disappeared. For obtaining the most active catalyst complex the addition of HBr should be stopped at this point. When AlBl₃ is used to make the catalyst, such milky appearance C not appear as the HCl is added. Instead the particles of AlCl₃ in suspension in the hydrocarbon merely become converted to the liquid complex. The addition of HCl is stopped before all of the AlCl₃ reacts so that the complex formed will contain come AlCl₃ particles suspended therein. The resulting complexes made with either AlCl₃ ro AlBr₃ are relatively stable materials having high catalytic activity.

When the aluminum halide is AlBr₃, the catalyst can also be used with the AlBr₃ dissolved in the hydrocarbon reactant so that the reaction mixture is homogeneous. When using this type of catalyst system, the AlBr₃ is dissolved in the dicyclic naphthene charge to the extent of 5–200% by weight on the hydrocarbon and RBr is pressured into the mixture in amount of at least 0.25% by weight of the hydrocarbon. The resulting reaction mixture remains homogeneous as the reaction occurs. With AlCl₃ a homogeneous system cannot be used since AlCl₃ is essentially insoluble in hydrocarbons.

The following examples illustrate the invention more specifically:

EXAMPLE I

This example illustrates the conversion of a $C_{12}$ dicyclic naphthene, namely, dicyclohexyl to dimethyl decahydronaphthalenes. A catalyst complex was prepared by reacting 100 parts by weight of AlBr₃, 47.5 parts of mixed dimethylhexanes and 8.6 parts of HBr at 75° C. in a bomb which was intermittently shaken for about 30 minutes. The mixture was cooled and allowed to separate, and the excess hydrocarbon which separated as an upper phase was decanted. The catalyst layer was a mobile oily liquid having an orange-yellow color. 4.14 g. of the catalyst complex and 415 g. of dicyclohexyl were added to a rocker bomb and the mixture was shaken at a temperature of about 250 C. for 134 minutes. The hydrocarbon phase was then separated from the catalyst layer and analyzed by vapor phase chromatography. The composition of the product in weight percent is shown in Table I.

Table I

| | Composition, wt. percent |
|---|---|
| $C_4$ paraffin | 2.9 |
| $C_5$ paraffin | 1.8 |
| $C_6$ paraffin | 0.7 |
| $C_7$ paraffin | 0.2 |
| $C_7$ monocyclic naphthenes | 0.4 |
| $C_8$ monocyclic naphthenes | 1.1 |
| $C_9$ monocyclic naphthenes | 0.4 |
| $C_{10}$ monocyclic naphthenes | 0.2 |
| Monomethyl decahydronaphthalenes | Trace |
| Dimethyl decahydronaphthalenes | 92.3 |
| Dicyclohexyl | None |

The data show that more than 90% of the dicyclohexyl charged was converted to dimethyl decahydronaphthalenes. The reaction time employed in this run was considerably longer than necessary for achieving this result.

EXAMPLE II

The present example illustrates the conversion of a $C_{14}$ dicyclic naphthene to tetramethyl decahydronaphthalenes. 7.8 g. of catalyst complex prepared in the same manner as in the preceding example and 5 ml. of 1,2-dicyclohexylethane were shaken in a rocker bomb at 0° C. for 2 hours. Analysis of the product by vapor phase chromatography gave the results shown in Table II.

Table II

| | Composition, wt. percent |
|---|---|
| $C_4$ paraffin | 0.8 |
| $C_5$ paraffin | 0.5 |
| $C_6$ paraffin | 0.3 |
| $C_7$ paraffin | 0.1 |
| Cyclohexane | 0.05 |
| Methylcyclohexane | 1.2 |
| $C_8$ monocyclic naphthenes | 0.3 |
| $C_9$ monocyclic naphthenes | 0.3 |
| $C_{10}$ monocyclic naphthenes | 0.3 |
| $C_{11}$ monocyclic naphthenes | 0.08 |
| Decahydronaphthalene | 0.07 |
| Monomethyl decahydronaphthalene | 0.2 |
| Dimethyl decahydronaphthalene | 0.5 |
| Trimethyl decahydronaphthalene | 0.5 |
| Tetramethyl decahydronaphthalene | 85.8 |
| 1,2-dicyclohexylethane | 9.4 |

From the data given it can be seen that 90.6% of the dicyclic naphthene was converted to other material and that about 95% of the amount so converted became tetramethyl decahydronaphthalenes.

EXAMPLE III

In this example the starting material was a $C_{13}$ dicyclic naphthene, and methylcyclohexane was added thereto as a diluent. The starting hydrocarbon composition was 67.8% by weight of dicyclohexylmethane and 32.2% methylcyclohexane. 5 ml. of the hydrocarbon blend were shaken at 0° C. for 2 hours with 5 g. of catalyst complex prepared as in the previous examples. Composition of the resulting hydrocarbon phase as determined by vapor phase chromatography is shown in Table III.

Table III

| | Composition, weight percent |
|---|---|
| $C_4$ paraffin | 2.8 |
| $C_5$ paraffin | 2.6 |
| $C_6$ paraffin | 1.1 |
| $C_7$ paraffin | 0.4 |
| Methylcyclopentane | 0.4 |
| Methylcyclohexane | 27.0 |
| $C_8$ monocyclic naphthene | 0.3 |
| $C_9$ monocyclic naphthene | 0.2 |
| $C_{10}$ monocyclic naphthene | 0.2 |
| $C_{11}$ monocyclic naphthene | 0.3 |
| Monomethyl decahydronaphthalene | Trace |
| Dimethyl decahydronaphthalene | 0.2 |
| Trimethyl decahydronaphthalene | 64.5 |
| Dicyclohexylmethane | None |

The conversion of dicyclohexylmethane to trimethyl decahydronaphthalenes in this run amounted to about 95%.

When other dicyclic naphthenes of the class herein specified are used, results analogous to those shown in the preceding examples are obtained. Likewise similar results are obtained when the AlBr₃ and HBr are used in a homogeneous system or when an AlCl₃-HCl catalyst is used.

In carrying out the present process it has been found that the hydrocarbon products which first form when the dicyclic naphthene charge rearranges is not the equilibrium mixture of decahydronaphthalene isomers that are obtained after longer reaction periods such 1–5 hours. At early stages of the reaction, products may appear which subsequently disappear if the reaction is allowed to proceed further. These products may be isomers that are not favored thermodynamically so that they are not present to any appreciable extent when the equilibrium mixture is reached. The invention can be practiced to yield a nonequilibrium product by using short reaction times such as 5–20 minutes or to produce an equilibrium mixture of decahydronaphthalene isomers by using a longer reaction time such as 1–5 hours.

I claim:
1. Method for preparing decahydronaphthalenes which comprises reacting a dicyclic naphthene having two uncondensed $C_6$ rings and 12–20 carbon atoms at a temperature in the range of −20° C. to 70° C. in the presence of a catalyst selected from the group consisting of $AlBr_3$-HBr catalysts and $AlCl_3$-HCl catalysts and recovering from the reaction mixture decahydronaphthalenes having the same number of carbon atoms as said dicyclic naphthene.

2. Method according to claim 1 wherein the temperature is in the range of 0–50° C.

3. Method according to claim 1 wherein said catalyst is a combination of $AlBr_3$ and HBr dissolved in the hydrocarbon and the amount of $AlBr_3$ is 5–200% by weight based on the hydrocarbon.

4. Method according to claim 1 wherein said catalyst is a preformed, hydrocarbon-insoluble liquid complex obtained by reacting $AlBr_3$, HBr and paraffin hydrocarbon having at least seven carbon atoms.

5. Method according to claim 1 wherein said catalyst is a preformed, hydrocarbon-insoluble liquid complex obtained by reacting $AlCl_3$, HCl and paraffin hydrocarbon having at least seven carbon atoms.

6. Method for preparing dimethyl decahydronaphthalene which comprises reacting dicyclohexyl at a temperature in the range of −20° C. to 70° C. in the presence of a catalyst selected from the group consisting of $AlBr_3$-HBr catalysts and $AlCl_3$-HCl catalysts and recovering from the reaction mixture dimethyl decahydronaphthalene.

7. Method according to claim 6 wherein the temperature is in the range of 0–50° C.

8. Method for preparing trimethyl decahydronaphthalene which comprises reacting dicyclohexylmethane at a temperature in the range of −20° C. to 70° C. in the presence of a catalyst selected from the group consisting of $ALBr_3$-HBr catalysts and $AlCl_3$-HCl catalysts and recovering from the reaction mixture trimethyl decahydronaphthalene.

9. Method according to claim 8 wherein the temperature is in the range of 0–50° C.

10. Method for preparing tetramethyl decahydronaphthalene which comprises reacting 1,2-dicyclohexylethane at a temperature in the range of −20° C. to 70° C. in the presence of a catalyst selected from the group consisting of $AlBr_3$-HBr catalysts and $AlCl_3$-HCl catalysts and recovering from the reaction mixture tetramethyl decahydronaphthalene.

11. Method according to claim 10 wherein the temperature is in the range of 0–50° C.

References Cited by the Examiner
UNITED STATES PATENTS

| 2,396,331 | 3/1946 | Marschner | 260—666 |
|---|---|---|---|
| 2,420,883 | 5/1947 | Johnson et al. | 260—666 |

OTHER REFERENCES

Levina et al.: J. Gen. Chem. (U.S.S.R.), vol. 7, pp. 341–349, 1937. Abstracted in Chemical Abstracts, vol. 31, column 4654, 1937.

Turova-Pollak et al.: Isomerization of Dicyclopentyl Zhur Obshchei Khim, vol. 23, pp. 1111–1116, 1953. Abstracted in Chem. Abstracts, vol. 47, column 12, 207f, 1953.

DELBERT E. GANTZ, *Primary Examiner.*

DANIEL E. WYMAN, ALPHONSO D. SULLIVAN, *Examiners.*